United States Patent [19]

Henneman et al.

[11] 4,185,520
[45] Jan. 29, 1980

[54] METHOD AND APPARATUS FOR CONTROLLING SPEED AND DIRECTION OF A VEHICULAR TOWING WINCH AND IMPROVEMENTS IN A TOWING WINCH

[75] Inventors: Richard C. Henneman; Kenneth A. Burdon, both of Bellevue; Joseph R. Bruce, Seattle, all of Wash.

[73] Assignee: PACCAR Inc., Bellevue, Wash.

[21] Appl. No.: 733,150

[22] Filed: Oct. 18, 1976

[51] Int. Cl.² .................. F16H 3/44; F16H 57/10; B66D 1/00; B66D 1/26
[52] U.S. Cl. .................. 74/750 R; 74/785; 192/4 R; 192/4 A; 254/187.4; 254/187.6; 254/185 R
[58] Field of Search .................. 192/4 R, 4 A; 254/187.4, 0.5, 0.6, 185 R; 74/750 R, 785, 768, 769, 411.5

[56] References Cited

U.S. PATENT DOCUMENTS

| | | | |
|---|---|---|---|
| 2,354,386 | 7/1944 | Lawler | 254/187.6 |
| 2,389,177 | 11/1945 | Ball | 254/187.6 |
| 2,693,722 | 1/1954 | Winther | 74/750 R |
| 2,781,879 | 2/1957 | Ebensold | 192/4 R |
| 3,296,893 | 1/1967 | Shaffer | 254/187.5 |
| 3,463,278 | 8/1969 | Broeker | 192/4 R |
| 3,631,950 | 1/1972 | Tonaka | 192/4 A |
| 3,797,325 | 3/1974 | Christison | 254/187.6 |
| 3,841,608 | 10/1974 | Schmitt | 254/166 |
| 3,850,411 | 11/1974 | Varilov | 254/187.6 |
| 3,851,739 | 12/1974 | Schneider | 254/187.5 |
| 3,885,656 | 5/1975 | Michling | 192/4 R |
| 3,915,433 | 10/1975 | Therkildsen | 254/187.1 |
| 3,939,950 | 2/1976 | Nishida | 192/4 R |
| 4,022,432 | 5/1977 | Toyomura | 254/185 B |
| 4,024,935 | 5/1977 | Sugimoto | 192/4 R |
| 4,033,553 | 7/1977 | Sugimoto | 192/4R |
| 4,042,215 | 8/1977 | Hakes | 254/187.4 |

*Primary Examiner*—Charles J. Myhre
*Assistant Examiner*—R. C. Turner
*Attorney, Agent, or Firm*—Seed, Berry, Vernon & Baynham

[57] ABSTRACT

A winch transmission and control which through selective energization of separate parts of the transmission enables the winch to automatically change to a different output speed, produce a fully braked condition, or a freewheeling condition. Reversing of the direction of the drum occurs through reversing the direction of the power input motor to the transmission. A unique, single lever hand control is operatively associated with means for energizing the clutch mechanisms which control the various parts of the transmission as well as control the reversibility and stroke of a pump which drives the input motor. The hand control assures a proper correlation between braking and powering of the drum. Another unique feature is a combination cable guide and external structural tie bar for a hollow drum of a towing winch used on a towing vehicle for strengthening the winch drum case. Another unique feature is a technique for installing large, slow-speed ball bearings in a bearing race.

8 Claims, 7 Drawing Figures

FIG. 3
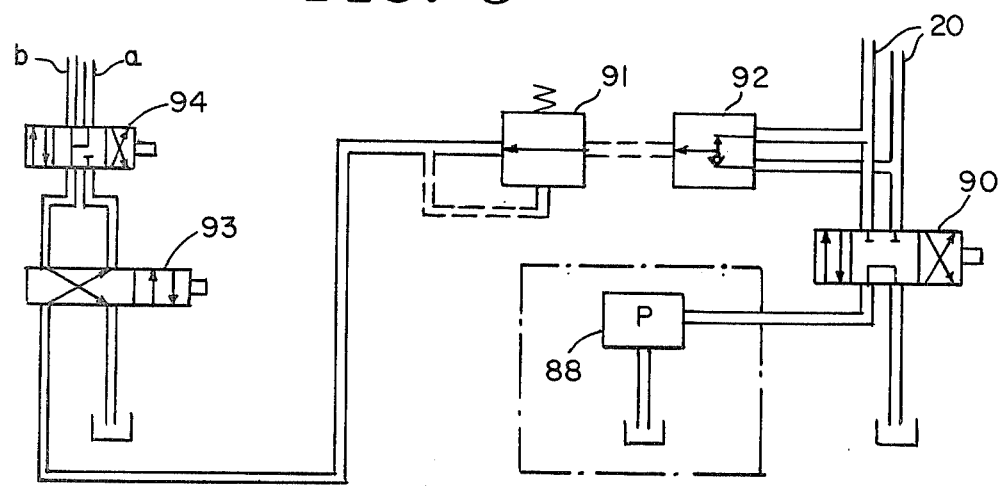
FIG. 6
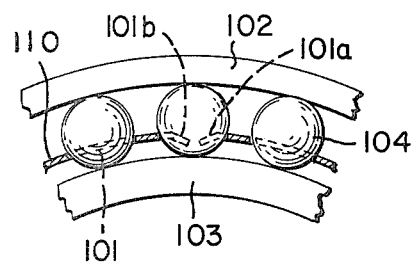
FIG. 4
FIG. 5
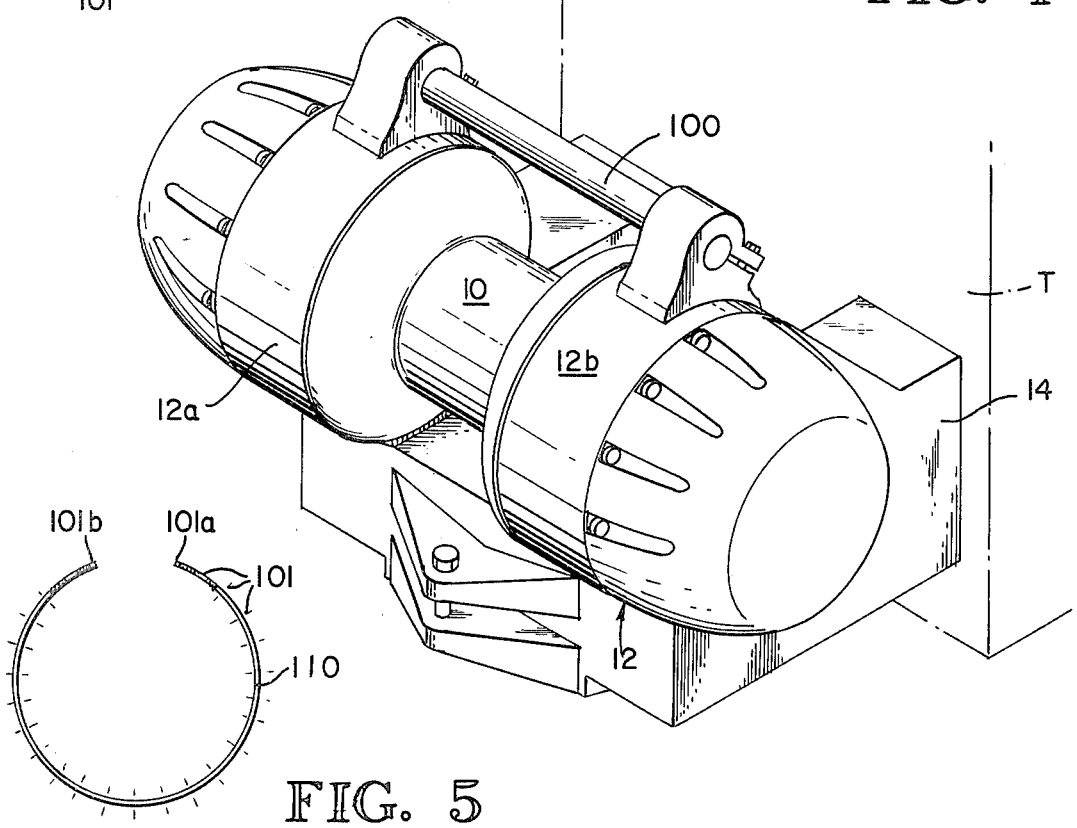

METHOD AND APPARATUS FOR CONTROLLING SPEED AND DIRECTION OF A VEHICULAR TOWING WINCH AND IMPROVEMENTS IN A TOWING WINCH

BACKGROUND OF THE INVENTION

1. Field of the Invention

This invention pertains to methods and apparatuses for controlling speed and direction of towing winches on vehicles and to improvements in the controls and the construction of such winches.

2. Description of the Prior Art

Winches for towing vehicles have, in the past, tended to be specially built for limited uses primarily because it was expensive and difficult to produce a winch meeting the requirement for the several different but specialized uses. A few attempts have been made to produce a winch and a method of controlling a winch which does provide more versatility without the inherent increase in expense and size of the winch. U.S. Pat. No. 3,729,171, for example, describes a method and a winch in which friction discs are used to selectively enable shifting from one direction to another at the output of the winch. U.S. Pat. No. 3,296,893, while not directed to a towing vehicle type of winch does have some features which are of value in controlling a winch. Both of these patented devices and method, however, do not provide sufficient versatility to be completely satisfactory. For example, the winch of the former patent requires varying independently the speed of the prime mover in order to obtain any change in speed of the winch drum and the hydraulic controls for operating the winch are expensive and very complicated to operate and maintain. In the latter patented device the winch is unable to provide a freewheeling condition which is essential in a towing winch for pulling out cable.

SUMMARY OF THE INVENTION

It is an object of this invention to provide method and apparatus for increasing the versatility of a towing winch.

It is another object of this invention to simplify the controls and method of controlling a towing winch.

Basically, these objects are obtained by providing a reversible input motor and a transmission, a part of which can be locked for providing one speed, an independent part of which can be locked for providing a second speed, all parts of which can be locked for completely braking the winch and all parts of which can be released for allowing the winch drum to freewheel. Control of the selective locking and releasing of the parts of the transmission are preferably obtained through fluid controls actuated from a single hand lever. The winch is easy to operate, provides optimum flexibility for different uses and eliminates more conventional band type brakes with their inherent problems of heat generation and maintenance.

Another feature of the invention is the provision of a single hand lever control for use with various types of winches in which a separate set of dependent members follows movement of the hand lever to release the winch drum brake only when it is safe and desirable to do so.

Still another feature of the invention is the provision of a cable guide and external tie bar for strengthening the end frames of the case of a hollow winch drum to support the winch drum against severe twisting loads due to pulling a load into the winch at an unfavorable angle to the axis of rotation of the winch.

Still another feature of the invention is a method of installing and holding large, slow-speed ball bearings in a bearing race such as in a winch drum.

BRIEF DESCRIPTION OF THE FIGURES OF THE DRAWING

FIG. 1A is a fragmentary schematic illustrating a portion of a hand lever control used with the winch shown in FIG. 1.

FIG. 3 is a second operational schematic of a second embodiment of the invention used with the transmission and winch drive of FIG. 1.

FIG. 4 is a schematic illustration of a typical towing winch using the improved tie-bar feature of this invention.

FIG. 5 is a side elevation of a bearing cage embodying the principles of one feature of the invention.

FIG. 6 is a fragmentary section taken along line 6—6 of FIG. 2.

DETAILED DESCRIPTION OF THE PREFERRED EMBODIMENTS

Figure 1:
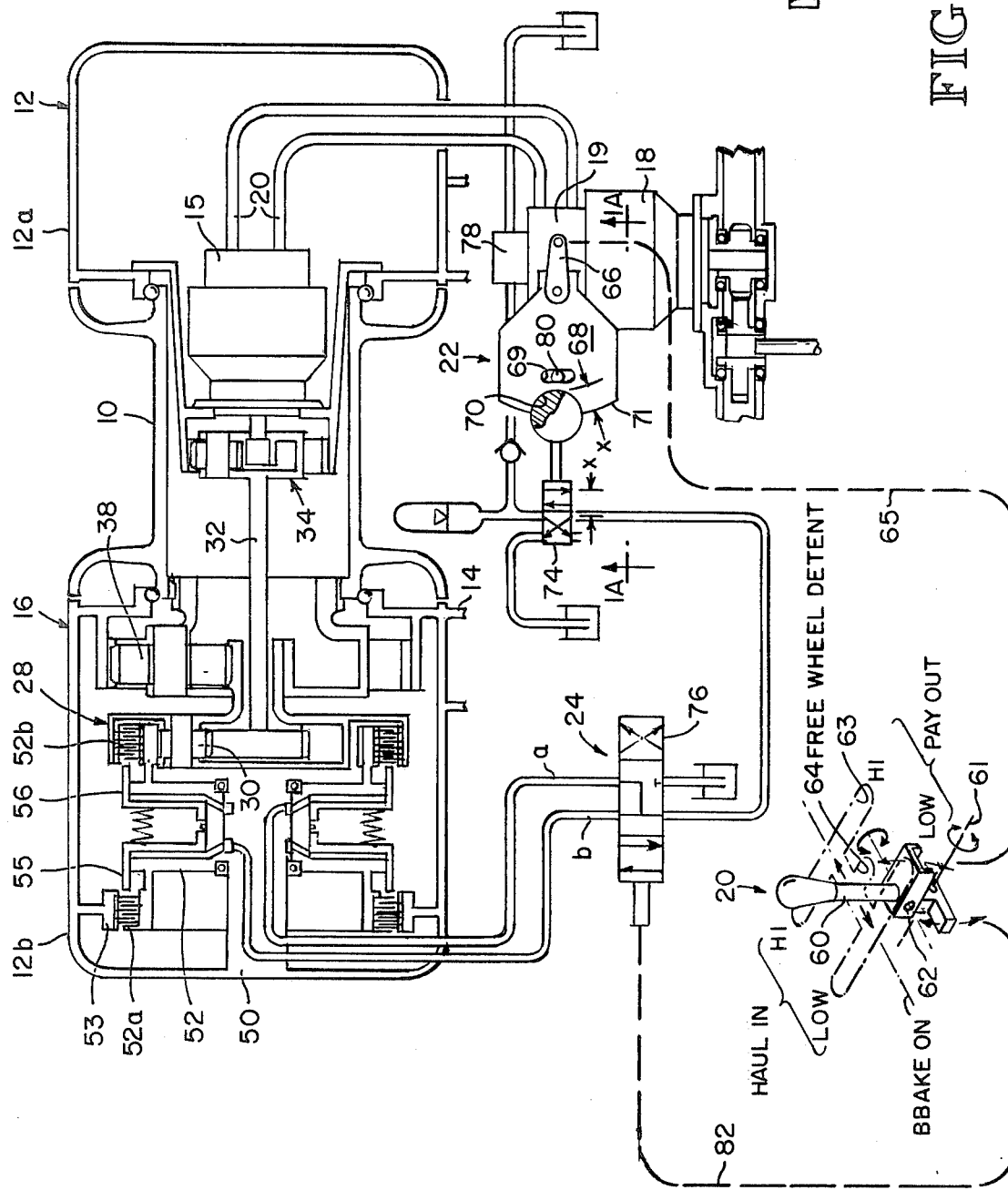
FIG. 1 is an axial schematic section taken through a transmission and winch drum and showing various controls used to operate the winch according to the principles of the invention.

The towing winch of this invention includes a cable drum 10 rotatably mounted on a winch case 12 which is fixed to the frame 14 that is connected to the vehicle T (FIG. 5). The winch is also provided with a reversible, fixed displacement, hydraulic motor 15 and a transmission 16. A variable displacement hydraulic pump 18 whose displacement is controlled by a servo mechanism 19 provides hydraulic power fluid through lines 20 to the motor 15. Control of the variable displacement over center pumping such as by adjusting the position of a swash plate and thus the direction and output of the pump and control of the hydraulically actuated elements of the transmission are obtained through a single lever hand control 20. This hand control operates a mechanical-hydraulic control 22 which controls braking, speed and direction of the winch and controls independently a hydraulic valve 24 which controls speed, braking and freewheeling of the cable drum via two control fluid input lines a and b.

The winch transmission 16 includes a first planetary set 28 comprising a first planet gear 30, a first sun gear 31 which meshes with the planet gear and which is secured to an input member 32. The input member is secured to a conventional planetary set 34 that is driven by the motor 15. The first planetary set 28 further comprises a first ring gear 36 which is formed integrally with a first planet carrier 36a and a second sun gear 36b.

The transmission 16 is further provided with a second planetary set 38 comprising second planetary gears 40, the second sun gear 36b, a second ring gear 42 that is fixed to the case 12 and a second planet carrier or output member 44 that meshes with a spline 46 on the cable drum 10.

The transmission case 12 is provided with a hub 50 that rotatably mounts a clutch ring 52. The clutch ring supports a first set of friction discs 52a and a second set of friction discs 52b. A ring gear 53 is meshed with the friction discs 52a and is fixed to the transmission case 12.

The friction discs are of a conventional design such that they are meshed with the teeth of the ring gears 53 and 36 and mesh with the clutch ring 52. When the discs are compressed they ultimately stop relative movement between the various ring gears and clutch ring and when released allow relative rotational movement. A set of clutch actuators 55 and 56 are spring biased by common springs 57 to hold the friction discs in their locking positions. A snap ring 58 limits retraction of the actuators. Each of the actuators forms a respective cavity or chamber 55a and 56a which, with suitable seals, forms a cylinder making the respective actuator a piston which will slide axially along the clutch ring 52. Hydraulic or pneumatic pressure to release one of the sets of friction discs by shifting the actuators is provided through the control fluid lines a or b which may be energized independently or simultaneously. As best shown in the operational chart in FIG. 1, simultaneous energization of lines a and b will release both of the sets of friction elements allowing the cable drum to freewheel. Deenergizing simultaneously both of the inlet lines a and b will cause the springs 57 to lock each of the friction discs so that the cable drum will be locked or in a braked condition. High speed operation of the winch drum will occur by energizing only inlet line b. When inlet b is energized friction discs 52a are released allowing the clutch ring to rotate on the hub 50. Since friction elements 52b, however, remain locked to ring gear 36, sun gear 36b will rotate at the same speed as input shaft 32 so that no decrease in speed is obtained. Low speed operation is obtained by energizing only input line a. When input line a is energized, friction discs 52b are released but the clutch ring is locked to the case through friction elements 52a. Now when input member 32 rotates, planet gears 30 are free to rotate thus producing an increased gear ratio driving the output member 44 at a reduced speed.

The mechanical-hydraulic hand lever control 20 and 22 are best explained from FIGS. 1 and 1A. A hand lever 60 is pivotally mounted to rotate transversely about an axis 61 and fore-and-aft about a perpendicular axis 62. Slots 63 are provided in a framework to guide the movement of the hand lever into the haul-in and pay-out positions in the respective low and high speeds. A freewheel slot position 64 is provided centrally from the brake-on position. The movement about axis 62 is translated through a control cable 65 to a control lever 66. As best shown in FIG. 1A the control lever 66 is mounted for pivotal movement and is integrally connected to a flat cam plate 68. The cam plate has a slot 69 as shown in FIG. 1. The cam plate also has a primary cam surface 71 and a concave detent or cam surface 70. As shown in FIG. 1, the detent 70 is resting against a cam follower 72. The cam follower is connected to the spool of a brake valve 74. Movement of the spool to the right positions the valve as shown in the drawing blocking control fluid to a main control valve 76. Movement of the spool to the left as by rotating the cam plate 68 until the surface 71 engages the cam follower allows control fluid to reach the main valve 76. Control fluid pressure is obtained in the preferred embodiment by a supplementary small charge pump 78 which operates at approximately 150 to 20 psi although a reduction valve as shown in the modified version can be used off the main pump 18 even though the main pump operates between 0 and 6,000 psi.

As best shown in FIG. 1A, a lower plate 79 is freely pivotally connected to the upper plate 68 but is splined to the servo control 19 of the main pump 18. Movement between the cam plate 68 and 79 is provided solely between the slot 69 and a detent pin 80 on the lower plate 79. With this arrangement it can be seen that when the hand lever 60 is pulled back into the free wheel detent position (slot 64) control cable 65 will pivot the plate 68 moving the spool of the brake valve to the left thus allowing charge pressure to reach the main control valve 24. (In the alternative, return of the cam 68 to a centered, brake-on position, cannot occur until the servo mechanism 19 has returned the pump to neutral position.) The spool of the main control valve is controlled by a cable 82. When the hand lever 60 is in the center position, the spool of the main control valve 24 is centered as shown in FIG. 1. While the cam follower 72 of the brake valve was in the detent position 70, the brake on the winch drum remained set because no control fluid could move either the actuator 56 or 55. This occurred even though the spool of the main control valve 76 was centered enabling energization of the actuator 55 and 56 if control fluid pressure were available. By having shifted out of the detent position and thus shifted the spool of the brake valve 74 to the left the control fluid pressure does reach the actuators 55 and 56 extending them and placing the winch into the freewheel position.

In all shifting positions the hand lever must pass through the center or brake-on position and the cam follower 72 will always come back to rest in the detent 70 of the upper cam plate 68 so that the brake will always be set on the winch drum when shifting. Whenever the hand lever is moved out of the brake-on position, however, it can be seen that the cam follower 72 moves onto the cam surface 71 thus shifting the spool of the brake valve to the left and enabling control fluid pressure to reach the main control valve. In each of the low and high speed positions on the brake-on position, however, it can be seen that moving off the brake-on position will first again unlock the brake by enabling pressure to reach the valve 24 and since the spool 76 of the main control valve has been shifted to the left or to the right of the position shown in FIG. 1, one of the actuators will immediately be extended. Thus at this time the winch drum is free to turn but cannot turn until gradual and further movement of the hand lever 60 into one of the speed positions will cause the pump to begin sending high pressure power fluid to the motor 15. The speed of the motor in each of the speed ranges will thus in the preferred embodiment be dependent upon the extent of movement of the hand lever as it directly controls the servo mechanism 19 or swash plate control of the main pump 18. Alternatively, of course, two speed ranges without further variation can be obtained if a fixed displacement pump was substituted for pump 18.

Another embodiment of the invention is best shown in FIG. 3. In this embodiment a fixed displacement, non-reversible pump 88 is coupled to power lines 20 through a manual four-way, three-position, control valve 90. Control fluid pressure is obtained by a pressure reducing valve 91 and a shuttle valve 92. A manual braking or blocking valve 93 functions as previous valve 74 and a manual four-way, three-position control valve 94 functions to selectively energize control fluid lines a and b as previously described. As is apparent this embodiment is a less expensive, more basic alternative. Other alternatives include operating either from a tractor power takeoff as shown, or using the tractor's own internal hydraulic pump as a substitute for pump 18 or 88. These various options of course all are usable with the winch transmission and allow replacement of the conventional gearing between the conventional gear driven winches and the power takeoff of the tractor with a resultant savings of about two-thirds of the space normally required for the gearing. The preferred embodiment, however, is with a pump coupled as part of the winch thus enabling the tractor owner to attach a complete, integral winch and power package to almost any type of tractor.

Another feature of the invention is the combined use of a cable guide 100 (FIG. 4) as a tie bar to strengthen the case 12 against unfavorable angle loads on the drum. As best shown in FIG. 1, the winch case or housing 12 has two end sections 12a and 12b which rotatably support the drum 10. Under severe side or angle loads the drum will twist if the end sections are not adequately tied together. Conventional winches were tied together through the hollow center of the winch drum. In this invention, however, the conventional cable guide bar 100 used to prevent the cable from pulling axially of the drum is uniquely made considerably larger and stronger to serve also as the tie bar.

Another feature of the invention is the method by which large, slow-speed ball bearings can be inexpensively installed in a large diameter drum such as 10 inches and larger. FIG. 5 illustrates a flat, inexpensive flat metal strip or cage 110 which has bearing holes 101 stamped in at equidistant spacings. The ends of the strip have half holes 101a and 101b. The strip is then rolled into a diameter which is slightly larger than the final diameter of the bearing cage when installed in between the bearing races 102 and 103. Ball bearings 104 are assembled between the races by compressing the discontinuous rolled strip and then placing each bearing in its respective hole allowing the strip to expand and hold the bearing in place against the outer race 102. When all bearings are installed the cage is allowed to fully expand and performs its normal function of spacing the bearings within the races. Alternately the strip can be made into a diameter slightly smaller than the final diameter of the bearing cage and be expanded to install ball bearings on an inner race. Installation of the opposite race occurs by axial insertion after the strip has returned to its normal position.

While the preferred embodiments have been illustrated and described it should be understood that variations will be apparent to one skilled in the art without departing from the principles herein. Accordingly, the invention is not to be limited solely to the form of the embodiments illustrated in the drawing.

The embodiments of the invention in which a particular property or privilege is claimed are defined as follows:

1. A winch and control system comprising:
a transmission housing,
an input member coupled to a bidirection variable speed fluid motor,
an output member coupled to a drum,
transmission means within said housing between the output and input members, said transmission means including two stages of planetary gearing having portions thereof coupled to two sets of friction locking members for selectively operatively coupling the portions of the two stages for providing the four functions of a low-speed range, a high-speed range, freewheel and drum locked, said drum locked condition occurring by locking said output member through said friction locking members to the interior of said housing, and
means for selectively actuating said friction locking members.

2. A winch and control system comprising:
an input member coupled to a bidirection variable speed fluid motor,
an output member coupled to a drum, and
transmission means between the output and input members, said transmission means including two stages of planetary gearing having portions thereof coupled to two sets of friction locking members for selectively operatively coupling the portions of the two stages for providing the four functions of a low-speed range, a high-speed range, freewheel and drum locked, said transmission means further including a fixed case, said friction locking members being totally within said case and including a first set of friction elements operable to releasibly lock the case to one stage of the planetary gearing for providing one gear ratio to said output member, a first actuator biased into a locking position for locking the friction elements and movable into a release position for releasing the friction elements, a second set of friction elements operable to releasibly lock a second stage of the planetary gearing to said first stage for providing a second gear ratio to the output member, a second actuator movable independently of said first actuator and biased into a locking position for locking the second set of friction elements and movable into a release position for releasing the second set of friction elements, and hydraulic control means for selectively moving only said first actuator for providing said one gear ratio, only said second actuator for providing said second gear ratio, both said actuators for providing freewheel movement of said output member, and no movement for locking both portions of said gear means to said case for locking said output member to the case.

3. The system of claim 2, including common spring means for biasing both said actuators into extended locking positions and stop means for limiting retraction of the actuators.

4. The system of claim 2, said first planetary stage having a first sun gear fixed to said input member, a first planet carrier having a first ring gear releasibly coupled to said second friction elements and fixed to a second sun gear, first planet gears meshed with said first sun gear and said first ring gear and rotatable on said first planet carrier, said second planetary stage having a second planet carrier coupled to said output member, a second ring gear fixed to said case, and second planetary gears rotatably mounted on said second planet carrier and meshed with said second sun gear and second ring gear, said first friction elements being operative to cause relative rotation between the first planet gears and first ring gear for rotation of the output member at a low speed, and said second friction elements being operative to lock said first planet gears to said first ring gear for rotation of the output member at a higher speed.

5. The system of claim 4, said hydraulic control means including a rotatable friction element support ring having opposite ends rotatably mounting said friction elements, said first and second actuators being axially slidably carried on said support ring and fitted tightly thereto for forming closed first and second fluid chambers between opposite ends of the support ring and the actuators, fluid ports coupling said fluid chambers with external valve means for selectively retracting the actuators into release positions by introduction of fluid into one or both of the first and second fluid chambers.

6. A method of controlling speed, direction, braking and freewheeling conditions in a towing winch mounted on a towing vehicle having a transmission within a casing, comprising:

powering a multiple stage planetary gear winch transmission having an input member and an output member by a variable speed, reversible fluid input drive circuit, selectively hydraulically controlling the locking of one stage of the transmission to drive the output member of the transmission at a first speed, selectively hydraulically controlling the locking of another stage of the transmission to said one stage independently of said first hydraulic controlled locking to drive the output member of the transmission at a second speed, selectively hydraulically controlling the locking of both said stages of the transmission simultaneously to said interior of said casing for locking the output member of the transmission independently of the input member, and selectively releasing all of said stages of the transmission for freewheeling the output member of the transmission.

7. The method of claim 6, the steps of selectively locking and releasing comprising manipulating a single hand lever.

8. The method of claim 7, including the step of automatically braking the drum by said simultaneous hydraulic control of the locking of both stages of the transmission during each change in direction of the drum caused by movement of said single hand lever.

* * * * *

UNITED STATES PATENT OFFICE
CERTIFICATE OF CORRECTION

Patent No. 4,185,520      Dated January 29, 1980

Inventor(s) Henneman et al

It is certified that error appears in the above-identified patent and that said Letters Patent are hereby corrected as shown below:

In the drawings, Sheet 1, Fig. 1, brake valve 74 should have its opening blocked. Also, for the single lever hand control 20, a position should be labeled -- BRAKE ON -- rather than -- "BBAKE ON"--.

Figure 2:
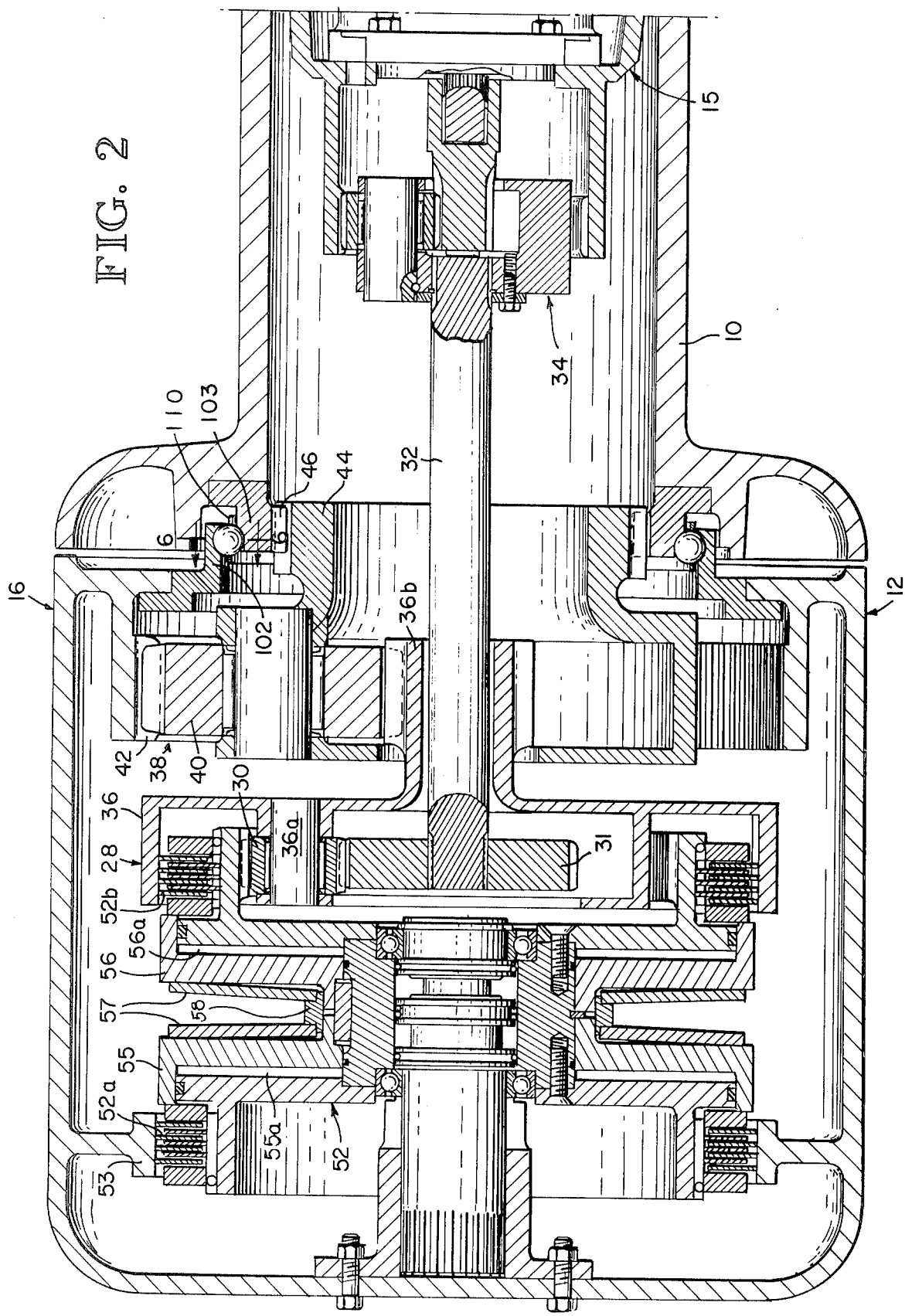
FIG. 2 is an enlarged axial section of the transmission.

In the drawings, Sheet 2, Fig. 2, reference numeral 15 should be applied to the motor, which is the piece having two nuts protruding from its right side. Also, reference numeral 58 should be applied to the snap ring, which is the small, rectangular sectioned piece between the clutch actuators 55 and 56 rather than the piece marked. The snap ring 58 is only shown at the bottom of the figure. Reference numeral "12" should be -- 12b -- (for consistency with Fig. 1). Finally reference numeral 50 should be added to designate the circular hub in the center of the drawing. This hub 50 has the bearings for the clutch, and is essentially concentric, although just to the left of, input member 32.

UNITED STATES PATENT OFFICE
CERTIFICATE OF CORRECTION

Patent No. 4,185,520          Dated January 29, 1980

Inventor(s) Henneman et al

It is certified that error appears in the above-identified patent and that said Letters Patent are hereby corrected as shown below:

In the drawings, Sheet 3, Fig. 4, change "12a" to --12b--, and change "12b" to --12a-- (for consistency with the other figures.

At column 2, line 40, change "pumping to -- pump --
At column 2, line 61, change "12" to --12b--.
At column 2, line 64, change "12" to --12b--.
At column 2, line 68, change "12" to --12b--.
At column 3, line 63, change "20 psi" to -- 200 psi--.
At column 4, line 37, delete "on the brake-on position."
At column 5, line 28, change "Fig. 5" to -- Figs. 5 and 6 --.

Signed and Sealed this

Seventeenth Day of March 1981

[SEAL]

Attest:

RENE D. TEGTMEYER

Attesting Officer      Acting Commissioner of Patents and Trademarks